Patented Mar. 14, 1933

1,900,981

UNITED STATES PATENT OFFICE

KARL DÖBMAIER, OF LEVERKUSEN-ON-THE-RHINE, GERMANY, ASSIGNOR TO WINTHROP CHEMICAL COMPANY, INC., OF NEW YORK, N. Y., A CORPORATION OF NEW YORK

PROCESS FOR RENDERING CARBON DISULPHIDE SOLUBLE IN WATER

No Drawing. Application filed September 6, 1927, Serial No. 217,872, and in Germany September 22, 1926.

The present invention relates to a new composition of matter comprising carbondisulphide, a butyl alcohol and a soap being soluble in water, and to aqueous solutions of carbon disulphide.

Emulsions of carbon disulphide have been already prepared in many ways. Hitherto however, it has not been possible to obtain clear aqueous solutions of carbon disulphide of any desired dilution.

In accordance with the present invention carbon disulphide is introduced into a mixture of a butyl alcohol and a soap, with the result that it is rendered miscible with water or dilute soap solutions in any proportion without the formation of emulsions or precipitates. Obviously this process can be carried out in various ways. Thus, for example, the soap and alcohol may be dissolved in water and carbon disulphide added with stirring or shaking or the soap and alcohol may be dissolved in carbon disulphide and the solution diluted with water or aqueous soap solution with stirring or shaking.

Or the carbon disulphide is stirred or shaken with water, the alcohol and soap being added until the desired solution has been obtained.

The invention is illustrated by the following example:—

In order to prepare a 5 per cent clear, aqueous solution of carbon disulphide 10 parts by weight of carbon disulphide are introduced into a mixture of 8.4 parts by weight of butyl alcohol, 4.6 parts by weight of soap and 250 parts by weight of water.

I claim:—

1. As a new composition of matter a mixture comprising carbon disulphide, a butyl alcohol and a soap, being soluble in water.

2. An aqueous solution of carbon disulphide, comprising 10 parts by weight of carbon disulphide, 8.4 parts by weight of butyl alcohol, 4.6 parts by weight of soap, and 250 parts by weight of water.

In testimony whereof I have hereunto set my hand.

KARL DÖBMAIER.